United States Patent [19]

Ciccone

[11] Patent Number: 4,955,309
[45] Date of Patent: Sep. 11, 1990

[54] YIELDABLE LINE ASSEMBLY AND IN LINE SHOCK ABSORBER

[75] Inventor: Frank E. Ciccone, Center Harbor, N.H.

[73] Assignee: International Nautical Supplies, Inc., Boston, Mass.

[21] Appl. No.: 348,946

[22] Filed: May 8, 1989

[51] Int. Cl.⁵ ............................................ B63B 21/00
[52] U.S. Cl. ...................................... 114/230; 267/70
[58] Field of Search ............... 114/215, 216, 109, 230, 114/253; 267/69–72; 119/96, 109

[56] References Cited

U.S. PATENT DOCUMENTS

| | | | |
|---|---|---|---|
| 1,222,480 | 4/1917 | Smith | 267/70 |
| 2,128,030 | 8/1938 | Koleno | 267/72 |
| 2,856,077 | 10/1958 | Stanton, Jr. | 267/71 |
| 3,206,037 | 9/1965 | Woolsey | 267/71 |
| 3,467,046 | 9/1969 | Welton | 114/230 |

FOREIGN PATENT DOCUMENTS 460828  12/1913  France ................................ 267/71

Primary Examiner—Joseph F. Peters, Jr.
Assistant Examiner—Edwin L. Swinehart
Attorney, Agent, or Firm—Samuels, Gauthier & Stevens

[57] ABSTRACT

A yieldable line assembly and in line shock absorber is discolored for use primarily in marine applications, including for example mooring lines, sail and canvas ties, etc. The shock absorber includes a tubular housing containing one or more coiled compression springs to which line segments are connected, and which are arranged to absorb shock by being resiliently compressed.

4 Claims, 2 Drawing Sheets

YIELDABLE LINE ASSEMBLY AND IN LINE SHOCK ABSORBER

BACKGROUND OF THE INVENTION

1. This invention relates to yieldable line assemblies, and to in line shock absorbers specially adapted for use in such assemblies. The invention is particularly useful in, although not strictly limited to, marine applications such as for example boat mooring lines, sail and canvas ties, etc.

2. Description of the Prior Art

Yieldable line assemblies and marine-type shock absorbers are already known, as, disclosed for example in U.S. Pat. Nos. 869,130; 3,353,817; 4,686,926; 973,315; 852,946; 721,465; 682,536; 730,009; 4,627,375; and 4,754,957. However, these prior art devices are characterized either by unduly complicated designs, which contribute to unnecessarily high manufacturing costs, or by other features which compromise reliability, particularly in the relatively harsh and corrosive environments in which such devices are often employed. There remains, therefore, an unfulfilled need for a yieldable line assembly and an in line marine-type shock absorber having simple designs which promote economy of manufacture, as well as operational reliability.

SUMMARY OF THE INVENTION

A basic objective of the present invention is the provision of an improved yieldable line assembly which can be manufactured economically, and which can operate reliably over extended periods of time. A related objective is the provision of an improved in line shock absorber for use in such assemblies, having an increased capacity for yieldably compensating for variations in line tension.

In one embodiment of the invention to be described hereinafter in more detail, an in line shock absorber has a unitary tubular housing molded of a non corrosive material, such as for example ABS plastic, with apertured walls at its opposite ends. The housing is internally subdivided into first and second chambers by an apertured plunger which is yieldably biased in one direction by a coiled spring contained in the first chamber.

A first flexible line is threaded through one apertured housing end wall, through the coiled spring in the first chamber, and through the apertured plunger, thus placing its end in the second chamber. A second flexible line is threaded through the opposite end wall, thus also placing its end in the second chamber. The ends of the first and second lines are enlarged by anchoring assemblies which prevent them from being withdrawn respectively through the apertured plunger and the apertured opposite end wall.

In a second embodiment of an in line shock absorber, a greater range of expansion and contraction is afforded by securing each line segment to one of two concentrically arranged axially movable components contained in the tubular housing, and by employing two springs to resiliently bias such components in opposite directions.

DETAILED DESCRIPTION OF DISCLOSED EMBODIMENTS

Figure 1:
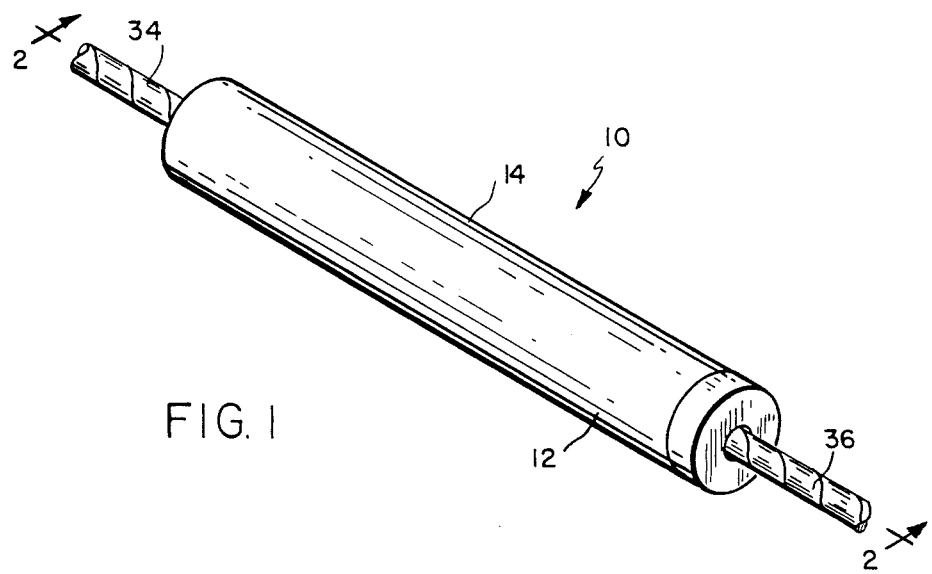
FIG. 1 is a perspective view of one embodiment of a yieldable line assembly in accordance with the present invention.
Figure 2:
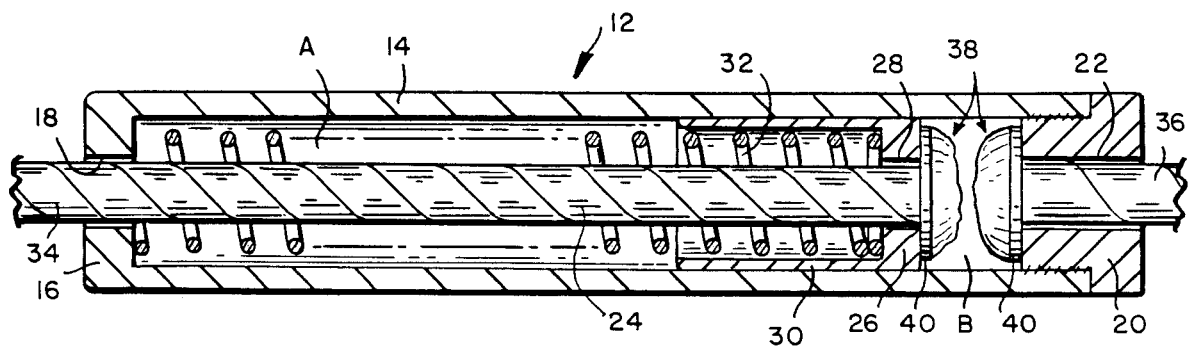
FIG. 2 is a sectional view taken along line 2—2 of FIG. 1.
Figure 3:
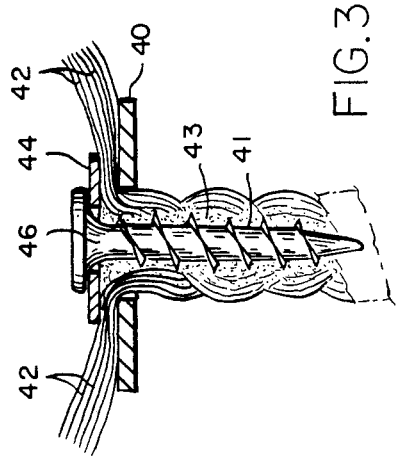
FIG. 3 is a sectional view taken through an end of one of the lines showing one stage in the application of an anchoring assembly.

Referring initially to FIGS. 1-3, a yieldable line assembly is shown at 10 comprising an elongated tubular housing 12. The housing includes a cylindrical wall 14 closed at one end by a first end wall 16 having a first opening 18 extending therethrough. The opposite end of the housing is closed by a plug defining a second wall 20 with a second opening 22 extending therethrough.

A plunger member 24 is slidably contained within the housing. The plunger member includes a third wall 26 with a third opening 28 extending therethrough in axial alignment with the first and second openings 18, 22 in the end walls 16, 20 of the housing. The third wall 26 is configured and dimensioned to subdivide the interior of the housing into first and second chambers denoted respectively at "A" and "B". The plunger member further includes a cylindrical sleeve 30 extending axially from the third wall 26.

A resilient coiled compression spring 32 is confined in the first chamber A between the first end wall 16 of the housing and the third wall 26 of the plunger. One end of the coiled spring is received in the cylindrical sleeve 30 of the plunger member.

A first flexible line 34 extends through the first opening 18 in housing end wall 16, through the coiled spring 32, and through the third opening 28 in the plunger wall 26. An end of the first line is thus located in the second chamber B.

Similarly, a second flexible line 36 extends through the second opening 22 in housing end wall 20, thus also locating an end of the second line in the second chamber B.

Anchoring means 38 are applied to the ends of the first and second lines 34, 36 in order to prevent them from being withdrawn from the second chamber B through their respective openings 28, 22.

Typically, the flexible lines constitute nylon rope segments. As can best be seen by further reference to FIGS. 3 and 4, each anchoring means 38 includes a metal base washer 40 having a diameter larger than the diameter of the opening through which withdrawal of the respective line is to be prevented. In a first stage of development of the anchoring means, as illustrated in FIG. 3, the end of the flexible line is threaded through the metal washer 40. Thereafter, an axial passageway 41 is punched into the end of the line, and the fibers 42 at the end of the end of the line are radially spread apart. Epoxy resin 43 is introduced into the passageway 41, after which a second smaller diameter washer 44 is centrally applied and secured in place by a screw 46 threaded into the passageway 41. The epoxy resin 43 stiffens the end of the line and thus prevents stretching under tension at initial areas adjacent to the base washer 40. Optionally, the second washer 44 can be eliminated in form of a screw with a larger diameter head.

Figure 4:
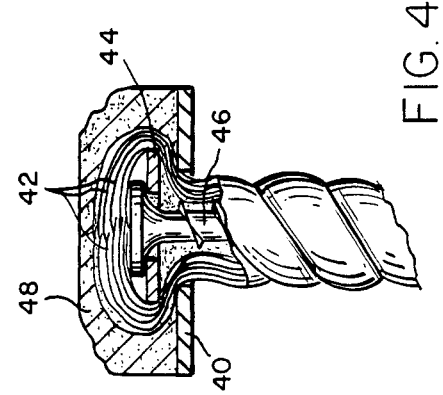
FIG. 4 is a sectional view similar to FIG. 3 showing the completed anchoring assembly.

Thereafter, as shown in FIG. 4, the end fibers 42 are wrapped over the head of the screw 46 as well as the washer 44, and an additional deposit 48 of epoxy resin is applied. The net result is an enlarged anchoring assembly which is securely attached to the end of the line, and which is configured and dimensioned to prevent the line from being withdrawn through its respective opening communicating with the second chamber B. Thus, the end of line 34 is prevented from being withdrawn from the second chamber B through the third opening 28 in the plunger wall 26. By the same token, the end of line 36 is prevented from being withdrawn through the second opening 22 in the housing end wall 22. Thus, when tension is applied to the lines 34, 36, the spring will be compressed between housing end wall 16 and plunger wall 26 as the plunger is pulled away from housing end wall 20 towards housing end wall 16.

Preferably, the housing components will be molded of a nonmetallic non-corrosive material such as for example ABS plastic. The same material preferably will be employed to fabricate the plunger member.

It will thus be seen that the yieldable line assembly of the present invention is designed to accommodate low cost manufacture, while at the same time providing for reliable extended use.

Figure 5:
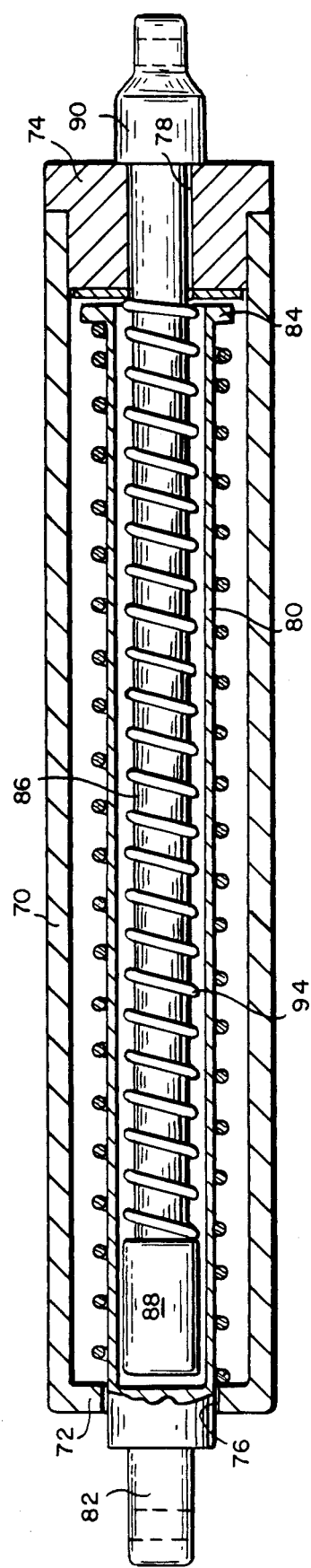
FIG. 5 is a sectional view taken through an alternate embodiment of an in line shock absorber in accordance with the present invention.

Referring now to FIG. 5, an alternate embodiment of an in line shock absorber is shown comprising an elongated tubular housing 70 having its opposite ends closed by first and second walls 72, 74 respectively provided with first and second openings 76, 78 extending therethrough. A tubular sleeve 80 extends through the first opening 76 into the interior of the housing. The sleeve terminates at one end exterior of the housing in an apertured extension 82 to which a line segment (not shown) may be tied. The opposite end of the sleeve is open and is surrounded by an enlarged diameter circular collar 84.

A rod member 86 extends through the second opening 78 in the opposite housing end wall 74 and into the sleeve 80. The rod member has an enlarged head 88 located at its inner end. The outer end of the rod member terminates exterior of the housing in another apertured extension 90 to which a second line segment (not shown) may be engaged.

A first coiled compression spring 92 surrounds the sleeve 80 and is axially confined between the first housing end wall 72 and the circular collar 84 on the sleeve 80. A second coiled compression spring 84 surrounds the rod member 88 and is confined axially between the enlarged head 88 and the second housing end wall 74.

It will thus be seen that upon tensioning of the line segments secured to the apertured extensions 82, 90 the first and second compression springs 92, 94 will be compressed as the sleeve 80 and rod member 86 are axially withdrawn in opposite directions from the housing 70. As compared to the shock absorber illustrated in FIGS. 1 and 2, this second embodiment thus accommodates greater axial expansion and contraction.

I claim:

1. A yieldable line assembly of the type employed to moor boats, to tie sails and canvasses, etc. comprising:

an elongated tubular housing having opposite ends closed by first and second walls respectively provided with axially aligned first and second openings extending therethrough;

a plunger member contained within said housing for axial movement therein, said plunger member having a third wall with a third opening extending therethrough and aligned axially with said first and second openings, said third wall being configured and dimensioned to subdivide the interior of said housing into first and second chambers;

a resilient coiled compression spring confined in said first chamber between said first and third walls;

a first flexible line, extending through said first opening and said coiled spring and said third opening, with an end of said first line being located in said second chamber;

a second flexible line extending through said second opening, with an end of said second line also being located in said second chamber; and anchoring means for preventing the ends of said first and second lines from being withdrawn from said second chamber respectively through said third and second openings, whereupon tensioning said lines will cause said spring to be compressed between said first and third walls as said first line is withdrawn from said first chamber.

2. The line assembly of claim 1 wherein said plunger member includes a tubular sleeve portion extending from said third wall and surrounding an end of said spring.

3. The line assembly of claim 1 wherein said flexible lines comprise nylon rope segments, and wherein said anchoring means includes metal washers having diameters larger than the diameters of the openings communicating with said second chamber, said washers being secured to the ends of said rope segments by fasteners axially threaded received therein.

4. The line assembly of claim 3 wherein the heads of said fasteners are covered by deposits of fiberglass epoxy resin.

* * * * *